United States Patent [19]

Simpson

[11] Patent Number: 5,676,914
[45] Date of Patent: Oct. 14, 1997

[54] METHOD FOR THE DESTRUCTION OF METHYLENE IODIDE

[75] Inventor: Dale R. Simpson, Bethlehem, Pa.

[73] Assignee: Competitive Technologies, Inc., Bethlehem, Pa.

[21] Appl. No.: 436,087

[22] Filed: May 8, 1995

Related U.S. Application Data

[63] Continuation of Ser. No. 233,810, Apr. 26, 1994, abandoned.

[51] Int. Cl.$^6$ .................................................... B01D 53/68
[52] U.S. Cl. ............................ 423/240.5; 423/245.1
[58] Field of Search ............................ 423/240.5, 245.1, 423/245.3; 588/213

[56] References Cited

U.S. PATENT DOCUMENTS

| | | | |
|---|---|---|---|
| 4,234,549 | 11/1980 | Stanley et al. | 423/210 |
| 4,532,368 | 7/1985 | Swanson et al. | 568/791 |
| 4,735,786 | 4/1988 | Inoue et al. | 423/240.5 |
| 4,740,982 | 4/1988 | Hakuta et al. | 423/240.5 |
| 4,934,142 | 6/1990 | Hoyashi et al. | 423/245.1 |
| 4,935,217 | 6/1990 | Simpson | 423/328 |
| 5,223,237 | 6/1993 | Simpson et al. | 423/244 |
| 5,284,638 | 2/1994 | Hertl et al. | 423/245.1 |
| 5,414,201 | 5/1995 | Greene | 423/240.5 |
| 5,417,947 | 5/1995 | Hertl et al. | 423/212 |

FOREIGN PATENT DOCUMENTS

| | | | |
|---|---|---|---|
| 899484 | 1/1982 | U.S.S.R. | B01J 20/16 |
| 2014970 | 5/1979 | United Kingdom . | |
| 2013641 | 8/1979 | United Kingdom . | |
| 84/04913 | 12/1984 | WIPO . | |

OTHER PUBLICATIONS

Barrer, R.M. et al. "Molecular Sieve Sorbents from Clinoptolite", *Can Jour. of Chem.* 42: 1481–1487, (1964) (no month).

Beyer, H.K., et al. "Structural Peculiarities and Stabalization Phenomena of Aluminum Deficient Mordenites", Structures and Reactivity of Modified Zeolites (ed P.A. Jacobs et al.) Studies in Surface Science and Catalysts, vol. 18, pp. 133–140, Elsevier (1984) (no month).

Chang, H., "Synthesis and Characterization of Aluminum-–Deficient Large Port Mordenite", Thesis Dept. Chem. Eng., Worcester Polytechnic Institute, 178 p, (1970) (no month).

Chen, N.Y., "Hydrophobic Properties of Zeolites", Jour. of Physical Chem. 80: 60–64. 1976 (no month).

Kranich, W.L., et al. "Prpoerties of Aluminum–Deficient Large Port Mordenites, Molecular Sieve Zeolites–I", Advances in Chemistry Series 101, *Am. Chem. Soc.*, 1972, pp. 502–513 (no month).

*New Swedish Technology*, "Cleaning With Zeolites", Swedish Nat'l Board for Technological Development, p. 5, (1988) (no month).

Scherzer, J. et al. "The Preperation and Characterization of Aluminum Deficient Zeolites", Chapter 10, Catalytic Material: Relationship between Structure and Reactivity, ed. T.E. Whyte, pp. 157–200 (1984) (no month).

*Primary Examiner*—Michael Lewis
*Assistant Examiner*—Stuart L. Hendrikson
*Attorney, Agent, or Firm*—Michael R. Novack

[57] ABSTRACT

A method is disclosed for decomposing methylene iodide, including the following steps: providing a hydrophobic sorbent zeolite, exposing the zeolite to methylene iodide in the presence of water or water vapor, so that the methylene iodide is adsorbed on the water, heating the zeolite to a first temperature of at least 100° to decompose the methylene iodide, and heating the zeolite to a second temperature of at least 400° to regenerate its sorbent characteristics.

2 Claims, No Drawings

METHOD FOR THE DESTRUCTION OF METHYLENE IODIDE

This is a continuation of U.S. application Ser. No. 233,810, filed Apr. 26, 1994 now abandoned.

FIELD OF THE INVENTION

This invention relates to a method of decomposing organic compounds and, more particularly to the regeneration of the sorptive characteristic of a zeolite after its use in collection and decomposition of an organic compound.

BACKGROUND

The quality of indoor air in industry, offices, and homes is a major concern, and is receiving increased attention from both health and regulatory agencies. The EPA has compiled a database of various pollutants which are from some commonly used materials as: hair sprays, rug cleaners, paints, varnishes, rugs, draperies, perfumes, pharmaceutical, and solvents. The EPA further notes that of all the organic compounds in their database, approximately half contain 9 carbon atoms or fewer, and most contain 23 carbon atoms or fewer. The airborne organic compounds tend to have a low molecular weight, since the heavier compounds have lower vapor pressures, and are generally not airborne. Many of the airborne organic compounds are derivatives of benzene, but others include alcohols, aldehydes (as formaldehyde), and chlorinated compounds (e.g., carbon tetrachloride, trichloroethylene). Benzene ($C_6H_6$), an important basic chemical and solvent, is used widely in the drug, plastic, and dye industry (additionally, it is an additive for gasoline). The threshold limit value (TLV) for benzene is 1 ppm. Carbon Tetrachloride ($CCl_4$), a widely used solvent and cleaning agent for oily materials and clothes, has a TLV of 5 ppm.

Benzene and carbon tetrachloride, as well as many of the other aforementioned groups of compounds, have molecular structures which fit well into a wide range of natural and synthetic crystalline materials known as zeolites. Zeolites comprise a family of natural and synthetic silicate minerals which find extensive industrial and commercial use as "molecular sieves", catalyst carriers, and ion exchange media. Most filters for organic compounds are composed of carbon based materials such as: paper, cloth, various plastics, or especially activated carbon. Removal of the organic contaminants from these filter materials involves washing commonly with steam, which results in loss in capacity, or heating, which can create a potential fire hazard. In contrast, a filter which uses zeolitic material may be regenerated simply by heating.

Zeolites are silicates which contains aluminum ions as substitutes for silicon. Such a substitution results in a charge imbalance which is compensated by the addition of an alkali ion, for example, sodium. It is the alkali which makes the zeolite hospitable for ion exchange. The framework of the molecular structures of different zeolites are arranged so that the zeolites contain cavities or voids having defined sizes. These cavities or voids have ports on the surface of the zeolite mineral which permit selective entry or exit by various materials based upon their relative sizes. Zeolites have a wide range in physical and chemical properties, but for the zeolite to be repeatedly used as a chemical sorbent for different compounds, the zeolite must be: 1) resistant to a variety of chemicals, 2) stable under the conditions for the regeneration, and 3) have a surface nature and pore which attracts and accommodates the particular compound.

Mordenite, one widely used zeolite, which exhibits the aforementioned properties, has an ideal composition of $Na_2O.Al_2O_3.10SiO_2.6H_2O$. Applicant's U.S. Pat. No. 4,935,217 discloses a method for the production of mordenite. As with the other members of the zeolite family, compositional variance around this ideal formula is common. The void dimensions of mordenite are approximately 2.9×5.7 Å and 6.7×7.0 Å. Mordenite has a high surface area (several hundred square meters per gram) and is an excellent sorbent for chemical constituents which will fit in the cavities of the crystal structure. Mordenite has a high silica to alumina ratio, which gives it thermal stability to a high temperature. Therefore, chemical constituents sorbed into the cavities of the mordenite can be purged by heating the mordenite to a high temperature, without damage to the mordenite's crystalline structure.

From a crystal structure point of view, the aluminum ions in the mordenite crystal create charge imbalances which are satisfied by alkali ions, such as sodium. Within the crystalline structure, this imbalance of charge is satisfied, but the crystal surface has broken bonds and unsatisfied charges. An ion exchange on the surface can involve a charged ion, such as $Na^+$, $K^+$, $NH_4^+$, but dipolar molecules as $H_2O$ are also attracted to the charge imbalance site on the crystal surface. So, if mordenite is exposed to a compound which is in the presence of water or water vapor, the water molecules will be competitive in filling the cavities of the zeolite, making space unavailable for non-polar organic compounds. The capacity and attraction for polar compounds such as water can be reduced by removing the aluminum and alkali sites from the crystal surface and within the cavities of the structure. There are a number of publications that indicate that aluminum deficient mordenite, as well as other zeolites can be produced by various heat and chemical treatments. Chen (1976) teaches that the hydrophobic nature of zeolites increases with the removal of aluminum and alkalies from the structure. Scherzer (1984), citing other studies in a review, notes that dealuminated Y zeolite has a high thermal stability and a low adsorptive capacity for water.

Although zeolites have emerged as an important tool in controlling pollution in the environment, there is room for further improvement in their application and use.

Removal of organic pollutants poses unique difficulties. The contaminant must be collected, separated from the water if necessary, as well as recycled or destroyed. Traditionally, organic compounds are collected from a gas or water stream by passage through some type of an adsorption bed. Activated carbon, diatomaceous earth, and zeolites (as well as other materials), can be used as sorbents in concentrating the organic compounds. However, with purging of the sorbent, these methods leave the organic contaminants concentrated in air or water, which requires further treatment. One method of treatment is combustion, which may be by flame or a catalytic combustion at a lower temperature than the flame. Catalytic combustion commonly involves passing a gas stream over a bed of zeolites, or alumina, loaded with a transition catalyst and held at an appropriate temperature.

Prior attempts at using zeolites to control pollution have primarily focused on separation of the zeolite from the water or water vapor stream, followed by absorption of the pollutant on the zeolite, followed by recovery of the pollutant from the zeolite. A disadvantage of the current practice is that it involves a two stage process. First, the adsorption bed used for concentrating the contaminant must be purged of the contaminant. Second, the stream removed from the bed containing the contaminant must be treated to destroy or recover the contaminant. A method of collection and treatment is described in U.S. Pat. No. 5,223,237 issued to the Applicant. Another method of collecting hydrocarbons in air or water is disclosed in published PCT Application WO 84/04913 (1984). Anderson et al. Anderson et al. teaches that the hydrocarbon content of air or water is reduced by passing the stream through a hydrophobic zeolite. Rustanov et al. (1984) shows that the hydrocarbon content of air or water is reduced by passing the stream through a hydrophobic zeolite.

These references teach methods of collecting organic compounds, but do not address the destruction or degradation of the contaminant after collection. It is among the objects of the present invention to provide a method for the decomposition of an organic compound and, to provide a method for the regenerating of the sorptive capability of a zeolite after its use in collection and decomposition of an organic compound.

SUMMARY

As first noted above, the removal and decomposition of organic compounds poses certain difficulties. Applicant overcomes these difficulties by providing a technique for collecting and decomposing the organic pollutant, and regenerating the adsorptive characteristic of the sorbent.

In a disclosed embodiment hereof, a sorbent zeolite is exposed to an organic compound. The surface of the zeolite, having a sorptive characteristic, selectively traps the organic pollutant. The organic compound is absorbed into a zeolitic cavity which acts as a microcontainer for subsequent reactions. With heating in air to about 200° C., the organic compound decomposes within the crystal. This decomposition is evident by coking, or carbonization, of the zeolite. The carbon residue is removed by a thermal soak at 500° C. in air, which regenerates the zeolite for reuse. Although it is presently considered less preferred, when the first temperature is reached, heating can continue directly to the second temperature so that the decomposition and regeneration are completed at the second temperature.

In a further embodiment, if the zeolite has a hydrophobic surface, the adsorption of the organic compound may be in the presence of water vapor or even liquid water. The surface of the zeolite, being hydrophobic, selectively traps the organic pollutant, allowing the water to pass through the zeolite. The aforementioned heating steps are then followed.

In a preferred embodiment, dealuminated mordenite is used for the collection and degradation of organic compounds in the presence of water or water vapor. In one proposed application, an indoor air purifier, including a flat canister of a wire mesh filled with dealuminated mordenite or a mixture of several types of mordenite is provided. Air would be directed through the canister with a small fan. After the filter is loaded with organic contaminants, it is removed and placed in a bake out unit, which can be visualized as similar to an electric frying pan or deep fat fryer. The bake out unit may be under the hood of a kitchen range, or industrially in an area where air is being exhausted. Many applications can be envisioned, such as filters employed in window units, incorporated in equipment, or worn for personal protection.

In accordance with an embodiment or the invention, a method is provided for decomposing an organic compound, including the steps of: providing a sorbent zeolite; exposing said zeolite to an organic compound, so that said organic compound is adsorbed on the zeolite; heating said zeolite to a first temperature sufficient to decompose the organic compound adsorbed thereon; and heating said zeolite to a second temperature high enough to regenerate its sorbent characteristics.

DETAILED DESCRIPTION

The following examples serve to illustrate techniques in accordance with the invention.

EXAMPLE 1

Aggregates of −6+10 mesh dealuminated mordenite with an Al/Si ratio of 1/8.60 were thermally soaked at 500° C. for two hours. The mordenite was cooled in air and then suspended over benzene in a closed container at 21° C. After 24 hours the suspended mordenite was removed and thermally soaked at 200° C. in an open crucible in air. The mordenite became black with carbon from the decomposition of benzene. The carbonized, or coked, mordenite was regenerated by a thermal soak in air at 500° C. In this and other examples, the cycle can be repeated one or more times.

EXAMPLE 2

The procedure of example 1 was repeated using successively toluene, the n, o, and p isomers of xylene, and styrene as the sorbate. With each, the dealuminated mordenite carbonized at 200° C. with heating in an open crucible or a test tube, and then the carbon was removed by oxidation in air at 500° C. to regenerate the sorbent. The surface area of the dealuminated mordenite was measured by the B.E.T. method as 337 meters$^2$/gram and after adsorption and carbonization at 200° C. the surface was 250 meters$^2$/gram. The 24% decrease in surface area with carbonization indicates that the carbon is coating, filling, or blocking the zeolitic cavities. The adsorptive capacity in weight percent of the mordenite for the different aromatic compounds with this procedure is as follows: benzene—10%; n xylene—9.5%; o xylene—9.51%; p xylene—9.32%; and styrene—10.2%.

EXAMPLE 3

The procedure of example 1 was repeated using pinene (turpentine). After adsorption, the mordenite carbonized at 200° C. The carbon was oxidized under a 500° C., 2 hours thermal soak, which regenerated the dealuminated mordenite for further adsorption.

EXAMPLE 4

Vapors from naphthalene were passed through an adsorption bed of dealuminated mordenite which had been previously soaked at 500° C. for two hours. After the bed showed a weight gain of 8.8%, the dealuminated mordenite carbonized during a thermal soak at 200° C. The sorbent was regenerated with thermal soaking at 500° C. to remove the carbon by oxidation in air.

EXAMPLE 5

Vapors from dichlorobenzene were passed through an adsorption bed of dealuminated mordenite which had been previously soaked at 500° C. for two hours. During the regeneration the sorbent carbonized and emitted a fume which was acid to indicator paper. The sorbent was further regenerated by oxidation of the carbon with a thermal soak at 500° C.

Examples 1–5 show that aromatic compounds, two ring aromatic compounds, chlorinated aromatic compounds, and cyclical hydrocarbon containing two different rings are readily adsorbed by dealuminated mordenite, and with thermally soaking the sorbent carbonizes. The sorbent is completely regenerated with an additional thermal soak. The carbonization indicates that the sorbate is destroyed during the regeneration cycle.

The following examples show the general applicability of the described method to the aliphatic compounds.

EXAMPLE 6

Methane was passed through an adsorption bed of dealuminated mordenite. The sorbent became carbonized with heating in a crucible or test tube at 200° C. Using the same technique, propane, butane, petroleum ether, and kerosene also were found to be adsorbed by the dealuminated mordenite and carbonize during the regeneration cycle.

EXAMPLE 7

The procedure of example 1 was repeated using successively the alcohols: methanol, ethanol, 2 propanol and diethylene glycol. The vapors of each of these compounds were adsorbed on dealuminted mordenite. During the thermal regeneration of the sorbent in a crucible, or test tube, the dealuminted mordenite carbonized. With thermal soaking at 500° C. the carbon was oxidized and the sorbent regenerated.

EXAMPLE 8

The procedures of example 1 was repeated using the ketones: acetone and methyl isobutyl ketone. Each of the ketones was adsorbed by the dealuminted mordenite and decomposed during the regeneration as shown by carbonization of the sorbent. The sorbent was regenerated by a thermal soak at 500° C.

EXAMPLE 9

The procedure of example 1 was repeated using 37% formaldehyde in water. Dealuminated mordenite with an Al/Si ratio of 1/8.60 was regenerated at 500° C. and used as the sorbent. After 24 hours of exposure to the formaldehyde and water vapors, the sorbate was thermally soaked at 200° C., and it carbonized. The carbon was removed by further oxidation in air at 500° C. Thus dealuminated mordenite is an effective sorbent for formaldehyde, which is an aldehyde. With regeneration of the sorbent, the aldehyde is decomposed.

EXAMPLE 10

Dealuminated mordenite was exposed to vapors formed by the volatilization of xylene and the volatilization of water at 21° C. After 24 hours the sorbent was thermally soaked at 200° C., and a carbon deposit formed on the mordenite. With further soaking at 500° C. the carbon residue was removed by oxidation and the sorbent regenerated.

EXAMPLE 11

Following the procedures of example 1, dealuminated mordenite was exposed at 21° C. to vapors of carbon tetrachloride for 24 hours. The weight gain of the sorbent was 18.35%. Heating of the sorbent in a test tube resulted in a fume which condensed. The condensate was strongly acid by indicator paper, had a refractive index as measured with an Abby Refractometer of 1.387, and smelled as hydrochloric acid. The index of refraction was similar to the azeotropic mixture of hydrochloric acid and water, namely 1.379, which represents 20.2% HCl and 79.8% $H_2O$. The condensate was HCl in water. The residual sorbent was carbonized, and this carbon was oxidized in air at 500° C. to regenerate the sorbent. Dealuminated mordenite is stable in an acid environment, and no degradation of the sorbent was found in subsequent experiments.

EXAMPLE 12

Using the procedures of example 1, dealuminated mordenite was exposed to vapor from trichloroethylene for 24 hours. The weight gain of the sorbent was 18.27%. During the thermal regeneration with heating at 500° C., the sorbent carbonized and then the carbon oxidized. The sorbent was again exposed to vapors of trichloroethylene and water for 24 hours. The weight gain was 16.6%. With the heating of the sorbent in a test tube there was fuming, and the condensate of the fume was strongly acid and had an index of refraction of 1.367. Based on the composition of the sorbate, the acidity of the fume, and the index of refraction, the condensate is 15% HCl in water, which is hydrochloric acid.

EXAMPLE 13

Using the procedure of example 1, dealuminated mordenite was exposed to vapors of methylene iodide for 24 hours. With heating for regeneration of the sorbent, the dealuminated mordenite carbonized and the fume was purple to brown and a condensate was acid. Examples 11, 12 and 13 establish the adsorption and the nature of the decomposition of haloginated carbon compounds using dealuminted mordenite.

The above discusses one preferred hydrophobic zeolite (dealuminated mordenite), but can also apply to other hydrophobic zeolites, two of which are the highly hydrophobic ZSM-5 and the closely related compound Silicalite. The following examples show that other zeolites may be used for the adsorption and destruction of organic compounds.

EXAMPLE 14

The procedures of example 1 was repeated using zeolites with commercial notation X, Y, and 13X. The sorbent was pellets, extrudates and powder. After exposure to o xylene for 24 hours, all of these sorbents carbonized during the thermal regeneration cycle. The experiment was repeated using natural clinoptilolite which was powdered. After adsorption of xytene, the natural clinoptilolite carbonized during the regeneration cycle.

EXAMPLE 15

The procedure of example 1 was repeated using different mordenites. Of the six additional mordenites, three were natural materials from Malheur, Oreg., Beatty, Nev., and Lovelock, Nev., and three were commercial samples: namely: LZM-5 from Union Carbide, and 900Na and 900H from Norton Company. Some of the samples were granular or powdered, others were pellets or extrudates. The six mordenites were subject to acid leaches and thermal soaks to dealuminate the stock. After drying at 500° C. all were exposed to acetone vapors for 24 hours. All of the sorbents were regenerated with a thermal soak at 500° C. During the regeneration all six of sorbents became dark gray or black indicating carbonization and decomposition of acetone as a source of the carbon.

What is claimed is:

1. A method for decomposing methylene iodide, comprising the steps of:
    (a) providing a hydrophobic sorbent zeolite;
    (b) exposing said zeolite to methylene iodide in the presence of water or water vapor, so that methylene iodide is adsorbed on the zeolite;
    (c) heating said zeolite to a first temperature of at least 100° C. to decompose the methylene iodide adsorbed thereon; and
    (d) heating said zeolite to a second temperature of at least 400° C. to regenerate its sorbent characteristics.

2. The method as defined by claim 1, further comprising repeating steps (b) through (d) a plurality of times.

* * * * *